(12) United States Patent
Stone et al.

(10) Patent No.: US 7,701,145 B2
(45) Date of Patent: Apr. 20, 2010

(54) SOLID EXPELLANT PLASMA GENERATOR

(75) Inventors: Nobie H. Stone, Huntsville, AL (US);
Garrett D. Poe, Madison, AL (US);
Robert Rood, Union Grove, AL (US)

(73) Assignee: NeXolve Corporation, Huntsville, AL (US)

( * ) Notice: Subject to any disclaimer, the term of this patent is extended or adjusted under 35 U.S.C. 154(b) by 432 days.

(21) Appl. No.: 11/852,007

(22) Filed: Sep. 7, 2007

(65) Prior Publication Data

US 2009/0066256 A1 Mar. 12, 2009

(51) Int. Cl.
*H01J 7/24* (2006.01)
(52) U.S. Cl. .............................. 315/111.11; 315/111.21
(58) Field of Classification Search ............ 315/111.21, 315/111.31, 111.71, 111.81, 111.91, 111.11; 118/722, 723 VE
See application file for complete search history.

(56) References Cited

U.S. PATENT DOCUMENTS

| | | | |
|---|---|---|---|
| 3,279,176 A | 10/1966 | Boden | |
| 3,321,919 A | 5/1967 | Marolda | |
| 4,825,646 A | 5/1989 | Challoner et al. | |
| 5,942,854 A * | 8/1999 | Ryoji et al. | 315/111.21 |
| 6,424,091 B1 * | 7/2002 | Sawada et al. | 315/111.81 |
| 6,640,535 B2 | 11/2003 | Gallimore et al. | |
| 2003/0152184 A1 | 8/2003 | Shehane et al. | |

FOREIGN PATENT DOCUMENTS

WO WO9222189 12/1992

* cited by examiner

*Primary Examiner*—David Hung Vu
(74) *Attorney, Agent, or Firm*—David E. Mixon; Bradley Arant Boult Cummings LLP

(57) ABSTRACT

An improved solid expellant plasma generator has been developed. The plasma generator includes a support housing, an electrode rod located in the central portion of the housing, and a mass of solid expellant material that surrounds the electrode rod within the support housing. The electrode rod and the solid expellant material are made of separate materials that are selected so that the electrode and the solid expellant material decompose at the same rate when the plasma generator is ignited. This maintains a point of discharge of the plasma at the interface between the electrode and the solid expellant material.

25 Claims, 3 Drawing Sheets

SOLID EXPELLANT PLASMA GENERATOR

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. NAS8-02105 and NAS8-01153 awarded by the National Aeronautics and Space Administration (NASA).

FIELD OF THE INVENTION

The invention relates generally to spacecraft propulsion. More specifically, the present invention relates to a solid expellant plasma generator for spacecraft.

BACKGROUND ART

The application of electrodynamic tethers in space applications is presently limited by the lack of a suitable plasma contactor device. Previously, the NASA Tethered Satellite System used an electron gun to emit electrons back into the conductive ionospheric plasma at the negative pole of the electrodynamic tether. Hollow cathode plasma generators were used on the Plasma Motor-Generator (PMG) tether mission. However, both, the electron gun and the hollow cathode are sensitive to contamination, depend heavily on spacecraft conditioned electrical power, and are complex. In particular, the Hollow Cathode requires a high pressure vessel and the associated pluming to regulate and handle the gaseous expellant.

Consequently, a plasma device that does not rely heavily on spacecraft resources (mass and conditioned electrical power) is desired. Also, the plasma device should be insensitive to contamination and, therefore, not require special on-orbit pre-operation conditioning or stand-by power and is capable of emitting large, multi-amp currents. In order to create such a plasma device, it is a requirement to emit large currents while minimizing the use of electrical power and expellant mass. Additionally, the device should use the emission of large currents at low power without the use of contamination-sensitive, low work-function materials.

SUMMARY OF THE INVENTION

In some aspects, the invention relates to a solid expellant plasma generator, comprising; a stainless steel support housing; a 0.9 mm diameter copper-clad carbon electrode rod located in the central portion of the support housing; a block of solid expellant material made of poly(butyl methacrylate) with poly(tetraethylene glycol diacrylate) crosslinks that surrounds the electrode rod within the support housing; where the electrode rod and the solid expellant material decompose at the same rate in order to maintain a point of discharge of the plasma at the interface between the electrode and the solid expellant material upon ignition of the generator; where the generator maintains an expellant mass utilization of 0.00325 kg/amp-hr or higher; and where the operating voltage of the generator is inversely proportional to the emission current once the generator reaches a critical emmission current of approximately 0.4 amps.

In other aspects, the invention relates to a solid expellant plasma generator, comprising: a housing; an electrode rod located in the central portion of the housing; a block of solid expellant material that surrounds the electrode rod within the housing; and where the electrode rod and the solid expellant material comprises separate materials that are selected so that the electrode and the solid expellant material decompose at the same rate in order to maintain a point of discharge of the plasma at the interface between the electrode and the solid expellant material.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The solid expellant plasma generator of the present invention uses a solid expellant to generate a conducting gas (i.e., plasma). The basic principle is that the expellant vapor cloud enables an electrical discharge that ionizes vapor particles. The heat generated by the discharge, in turn, vaporizes additional expellant, which replenishes the expanding cloud and maintains the conditions required for the electrical discharge to function. This device is robust and eliminates the need for high pressure vessels, heaters, pressure regulators, valves and other pluming components. The generator is also insensitive to contamination, and does not require on-orbit conditioning or regulated power.

The purpose of the solid expellant plasma generator is to provide a suitable plasma contactor device for the operation of electrodynamic tethers in space. The generator requires only a center electrode surrounded by a solid expellant block. The device is powered by unregulated electrical power developed by the electrodynamic tether in the generator mode, or by unregulated solar-electric power in the motor mode.

Figure 1:
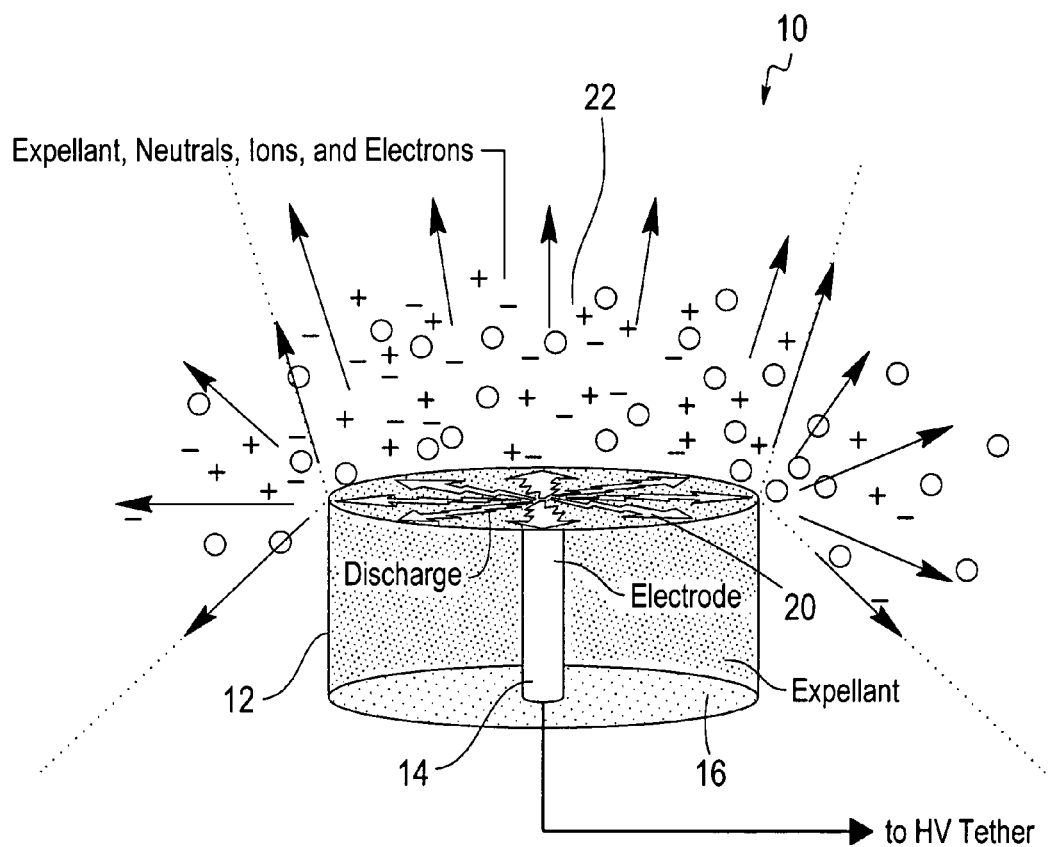
FIG. 1 is a conceptual schematic diagram a solid expellant plasma generator in accordance with one embodiment of the present invention.

FIG. 1 is a conceptual schematic diagram a solid expellant plasma generator in accordance with one example of the present invention. As shown, the solid expellant plasma generator 10 includes a cylindrical shaped housing 12 that contains an electrode rod 14 located in the center section of the housing 12. A block of solid expellant material 16 surrounds the electrode rod 14. The solid expellant material 16 is cast in a shape to fill the interior of the housing 12. The electrode rod 14 is connected 18 to a high voltage tether (not shown) in order to provide a source of electrical power to the electrode rod 14. As the electrode rod 14 discharges 20, neutral particles, electrons, and ions are expelled in the form of a vapor cloud from the generator 22.

Figure 2:
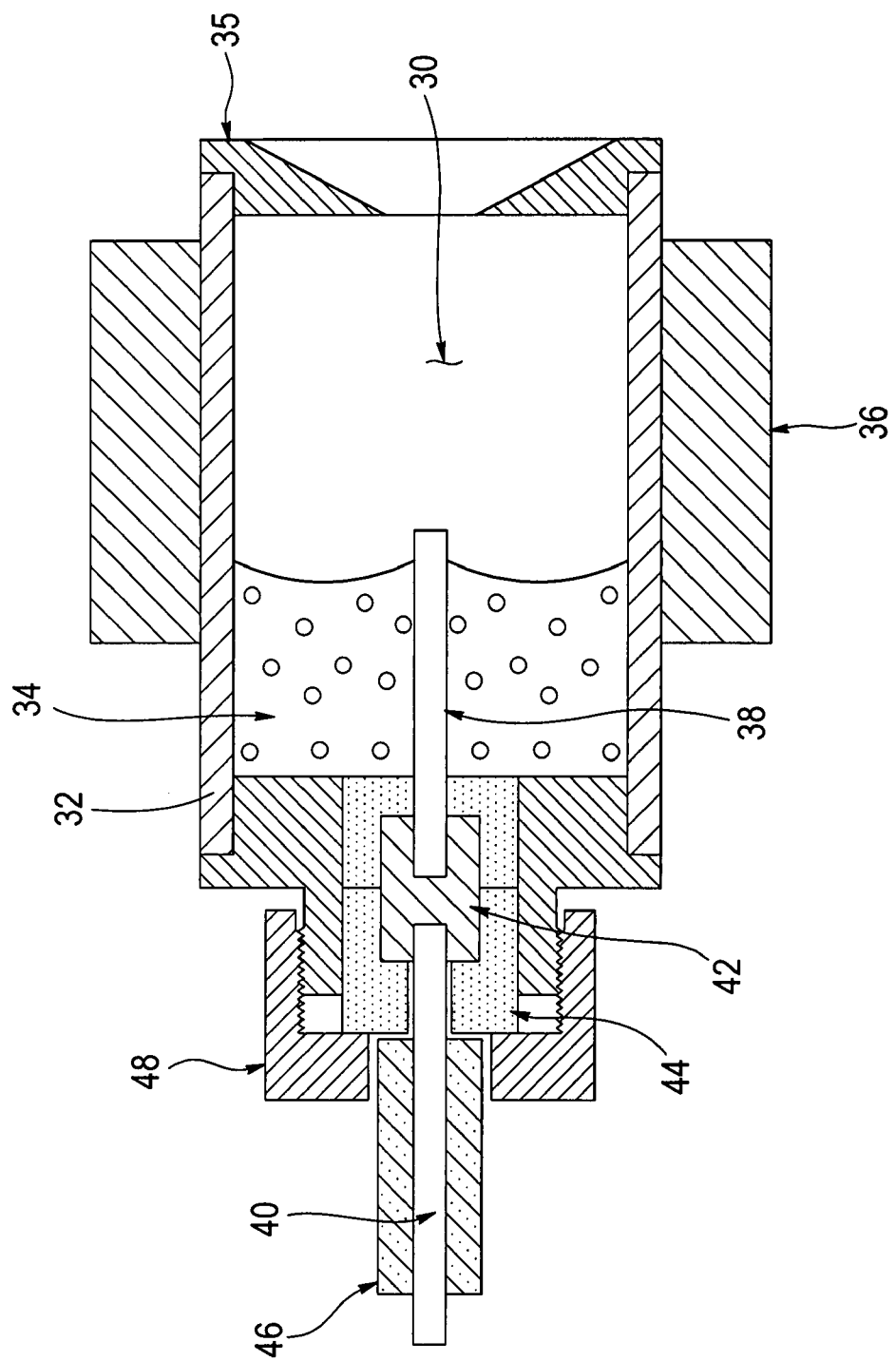
FIG. 2 shows a cross-sectional diagram of an ionization chamber located above the expellant block in accordance with one embodiment of the present invention.

The solid expellant plasma generator is capable of operating in the configuration shown in FIG. 1. However, efficiency is improved by the addition of an "Ionization Chamber" above the Expellant Block, as shown in FIG. 2. The ionization chamber 30 consists of: an extension of the metallic support canister 32 beyond the top surface of the expellant block 34; an aperture 35 with a smaller diameter orifice (which has the effect of limiting the escape of the neutral vapor cloud); and a pertinent magnet 36, which is in the shape of a hollow cylinder, and fits over the exterior of the support canister 32. This has the effect of increasing the path length of ionizing electrons before they escape the discharge region. The increased vapor pressure, as a result of the support canister extension 32 and aperture 35, and the increased path length of the electrons, result in improved ionization efficiency of the vaporized expellant and therefore improved expellant mass utilization. Also shown in FIG. 2 is the electrode 38 and power supply wire 40 that are attached by an electrical connector 42. They are cover by high voltage insulation 46 and high temperature insulation 44. The power supply wire 40 is held in place by a capture nut 48.

It should be noted that alternative embodiments of the present invention may utilize different configurations of features and different types of materials. For example, the electrode rod may be located in alternative locations other than the center of the housing. In one such embodiment multiple rods may be used in the housing to provide enhanced current capacity. Further, the solid expellant may be a variety of materials such as a wax (e.g., paraffin wax) or a polymeric material such as: polyethylene; nylon; poly(methyl methacrylate); poly(butyl methacrylate); crosslinked polyethylene; or teflon. One particular material that may be used is poly (butyl methacrylate) with poly (tetraethylene glycol diacrylate) crosslinks. It is generally preferred to use polymers that do not melt and that depolymerize without ashing. The electrode may be made of such materials as: copper-clad carbon; uncoated carbon; tungsten; copper; or stainless steel. The key characteristic of the materials of the electrode and the solid expellant is that they must be matched so that each material decomposes at the same rate. The materials used for the housing may be either conductive or non-conductive. Materials such as aluminum or stainless steel may be used. The key characteristic of the housing is that it provides structural support for the solid expellant material, the discharge chamber, etc.

The function of the solid expellant plasma generator is analogous to that of a candle in which the heat of the flame melts the tallow which, in turn, fuels the flame. The center electrode is biased sufficiently that an electrical discharge is initiated between it and the vapor cloud. The heat of the electrical discharge decomposes additional material from the surface of the solid expellant block in the immediate vicinity of the center electrode. The expellant maintains the vapor cloud at a sufficient column density to ensure a high collision rate between the energetic charged particles, accelerated away from the center electrode, and the neutral vapor particles in the cloud. Each ionizing collision creates a charged pair . . . a positive and a negative particle. Some of the particles that are of opposite polarity to the center electrode will be accelerated back into the electrode, which is maintained at an emissive temperature by the resulting collisions.

As previously mentioned, the center electrode is designed so that it decomposes at the same rate as the block of solid expellant is depleted. This maintains the point of discharge at the interface between the electrode and solid expellant material. This is key to achieving a reliable ignition of the generator. Also, it is critical for maintaining stable and efficient evaporation/sublimation of the electrode/expellant of the generator.

Figure 3:
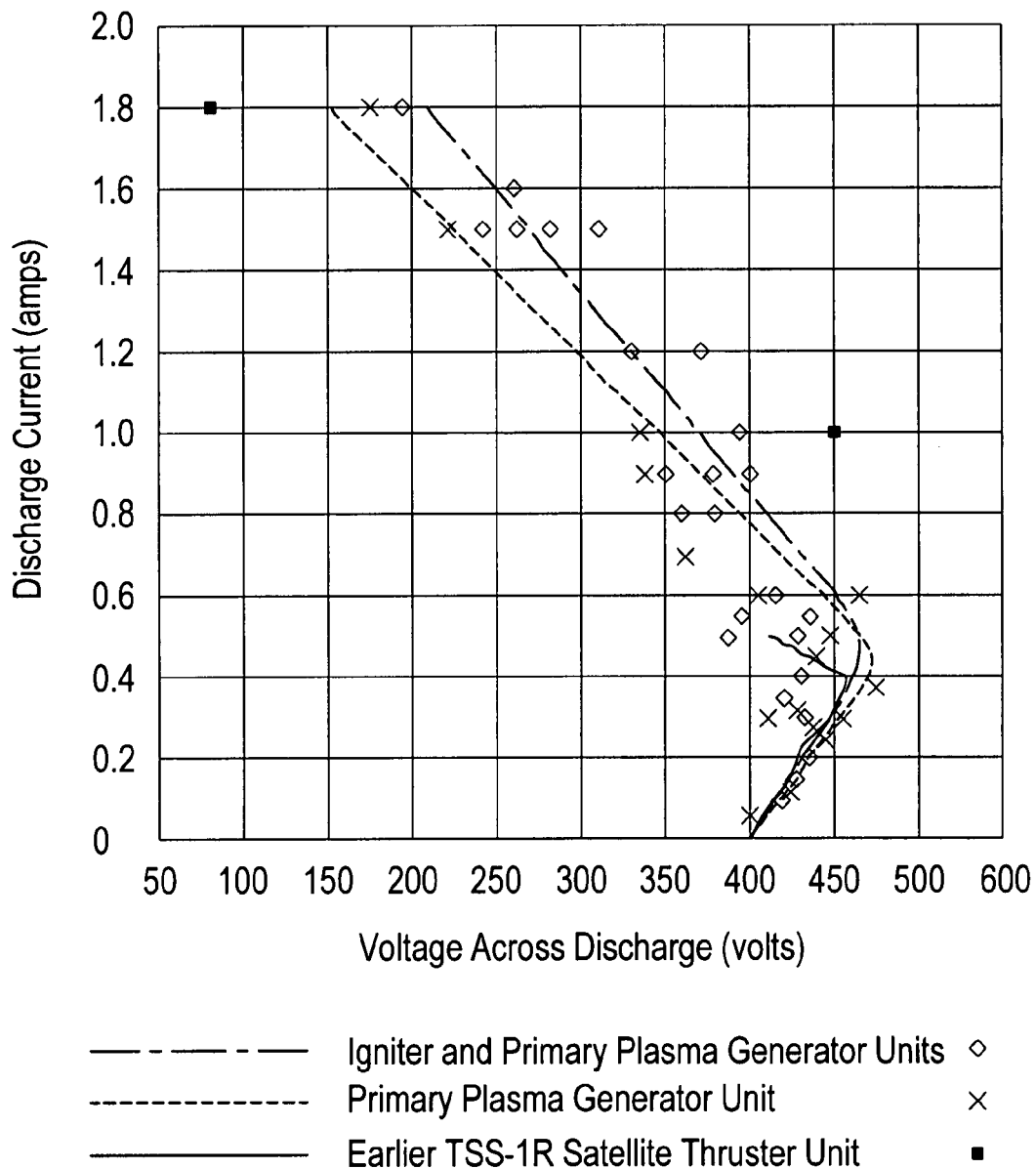
FIG. 3 is a graph that shows the discharge current (amps) as a function of the voltage across the generator discharge (volts) in accordance with one embodiment of the present invention.

In some embodiments, the center electrode is a 0.9 mm copper-clad carbon rod. In alternative embodiments, the electrode is a 0.9 mm solid tungsten rod. The performance characteristics of the solid expellant plasma generator as shown in FIG. 3 which shows the discharge current (amps) v. the voltage across the generator discharge (volts). The performance of the generator shows an emission current capacity of more than 1.8 amps. Above a critical emmission current, the operating voltage of the generator is inversely proportional to emission current and decreases to less than 100 volts at 1.8 amps. In testing, the critical emission current was approximately 0.4 amps. Also, the expellant mass utilization of a test model was 0.00325 kg/amp-hr.

The solid expellant plasma generator can be used in any application where a plasma generator is required. Examples of potential applications include: the control of spacecraft charging on commercial satellites placed in synchronous orbit where differential charging is a known problem; and the vapor deposition process used, for example, in the semiconductor industry. In should be clear that the present invention could also be used in any other applications know in the art that require a plasma generator.

Key advantages of the present invention include the generation of a self-sustained, self-fuelled electrical discharge. Additionally, the expellant material produces multiple vapor particles per solid particle which are chemically benign. Consequently, the vapor particles do not react chemically with satellite surfaces or structures. Finally, the unique design of the center electrode, effectively "burns" at the same rate as the expellant block is depleted in order to maintain a stable discharge.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A solid expellant plasma generator, comprising:
a stainless steel support housing;
a 0.9 mm diameter copper-clad carbon electrode rod located in the central portion of the support housing;
a block of solid expellant material made of poly(butyl methacrylate) with poly(tetraethylene glycol diacrylate) crosslinks that surrounds the electrode rod within the support housing;
wherein the electrode rod and the solid expellant material decompose at the same rate in order to maintain a point of discharge of the plasma at the interface between the electrode and the solid expellant material upon ignition of the generator;
wherein the generator maintains an expellant mass utilization of 0.00325 kg/amp-hr or greater; and
wherein the operating voltage of the generator is inversely proportional to the emission current once the generator reaches a critical emmission current of approximately 0.4 amps.

2. A solid expellant plasma generator, comprising:
a housing;
an electrode rod located in the central portion of the housing;
a block of solid expellant material that surrounds the electrode rod within the housing; and
wherein the electrode rod and the solid expellant material comprises separate materials that are selected so that the electrode and the solid expellant material decompose at the same rate in order to maintain a point of discharge of the plasma at the interface between the electrode and the solid expellant material.

3. The generator of claim 2, wherein the housing is made of a non-conductive material.

4. The generator of claim 2, wherein the housing is made of a conductive material.

5. The generator of claim 2, wherein the housing is made of aluminum.

6. The generator of claim 2, further comprising a plurality of electrodes located in the central housing.

7. The generator of claim 2, wherein the electrode is made of copper clad carbon.

8. The generator of claim 2, wherein the electrode is made of uncoated carbon.

9. The generator of claim 2, wherein the electrode is made of tungsten.

10. The generator of claim 2, wherein the electrode is made of copper.

11. The generator of claim 2, wherein the electrode is made of stainless steel.

12. The generator of claim 2, wherein the solid expellant material is Teflon.

13. The generator of claim 2, wherein the solid expellant material is wax.

14. The generator of claim 2, wherein the solid expellant material is paraffin wax.

15. The generator of claim 2, wherein the solid expellant material is polymeric material.

16. The generator of claim 2, wherein the solid expellant material is polyethylene.

17. The generator of claim 2, wherein the solid expellant material is nylon.

18. The generator of claim 2, wherein the solid expellant material is poly (methyl methacrylate).

19. The generator of claim 2, wherein the solid expellant material is poly(butyl methacrylate).

20. The generator of claim 2, wherein the solid expellant material is crosslinked polyethylene.

21. The generator of claim 2, wherein the solid expellant material is a non-melting polymeric material.

22. The generator of claim 2, wherein the solid expellant material is a non-ashing polymeric material.

23. The generator of claim 2, wherein the generator has a discharge rate of 0.00325 kg/amp-hr or higher.

24. The generator of claim 2, wherein the generator has an emission current capacity of greater than 1.8 amps.

25. The generator of claim 24, wherein the generator has an operating voltage of less than 100 volts when the emission current capacity is greater than 1.8 amps.

* * * * *